United States Patent
Land

[15] 3,684,359
[45] Aug. 15, 1972

[54] METHOD AND APPARATUS FOR EDITING MOTION PICTURE FILM

[72] Inventor: Edwin H. Land, Cambridge, Mass.

[73] Assignee: Polaroid Corporation, Cambridge, Mass.

[22] Filed: July 17, 1970

[21] Appl. No.: 55,736

[52] U.S. Cl. ..................... 352/38, 352/92, 352/180, 352/236
[51] Int. Cl. ..................... G01b 21/48, G01b 21/50
[58] Field of Search.................. 352/38, 92, 180, 236

[56] References Cited

UNITED STATES PATENTS

| 2,905,048 | 9/1959 | Miller | 352/38 |
| 3,580,667 | 5/1971 | Moore | 352/124 |
| 3,301,628 | 1/1967 | Hellmund | 352/92 X |

*Primary Examiner*—Louis R. Prince
*Assistant Examiner*—Frederick Shoon
*Attorney*—Brown and Mikulka, William D. Roberson and Robert L. Berger

[57] ABSTRACT

A motion picture film editing method and apparatus by which film portions to be deleted during presentation by projection are indicated by signals recorded on the film. The signals function to control film advance speed so that the deleted portions of the film are fed at high speeds past the projector light path. Also the light path is blocked during passage of the deleted film portions therethrough.

17 Claims, 6 Drawing Figures

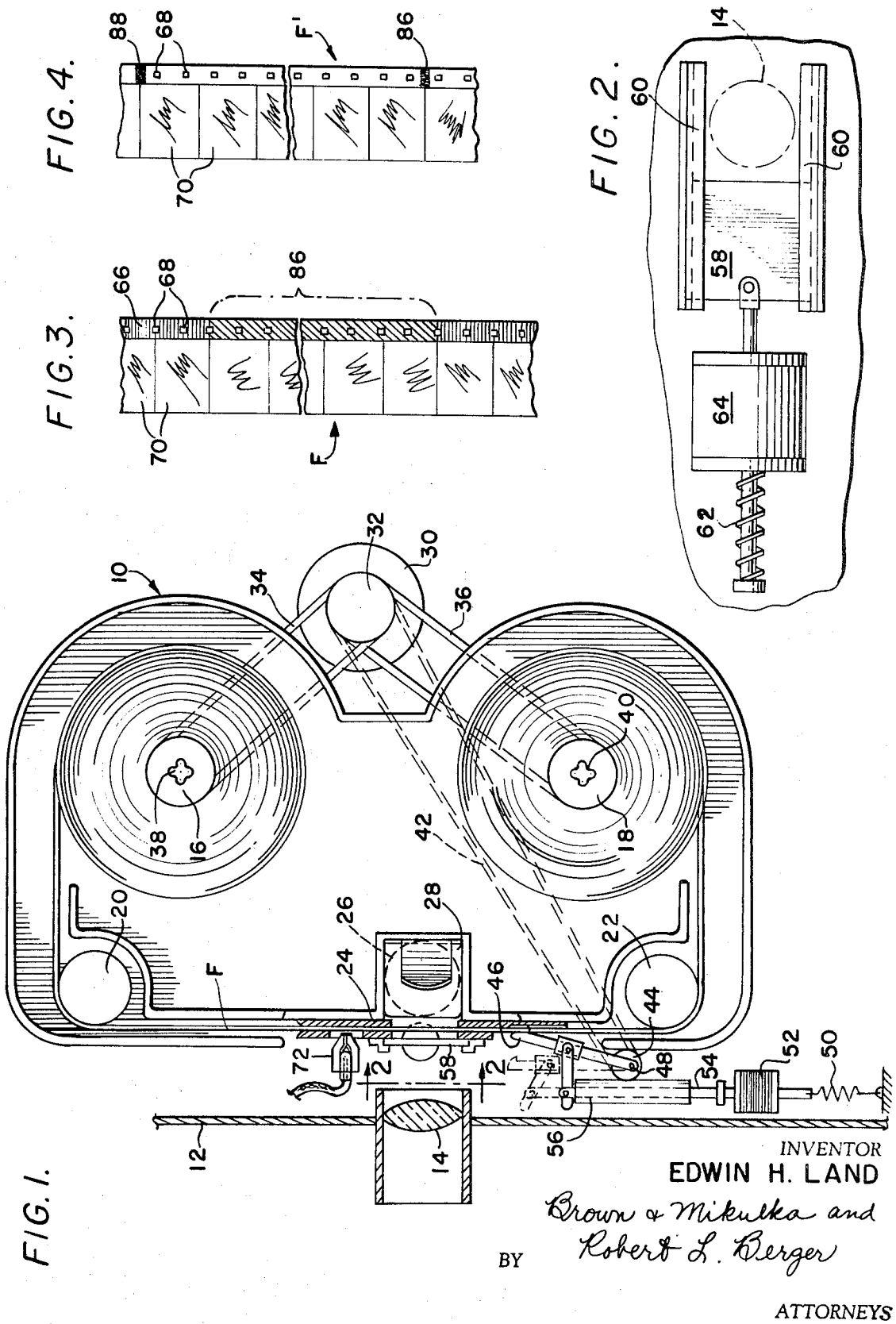

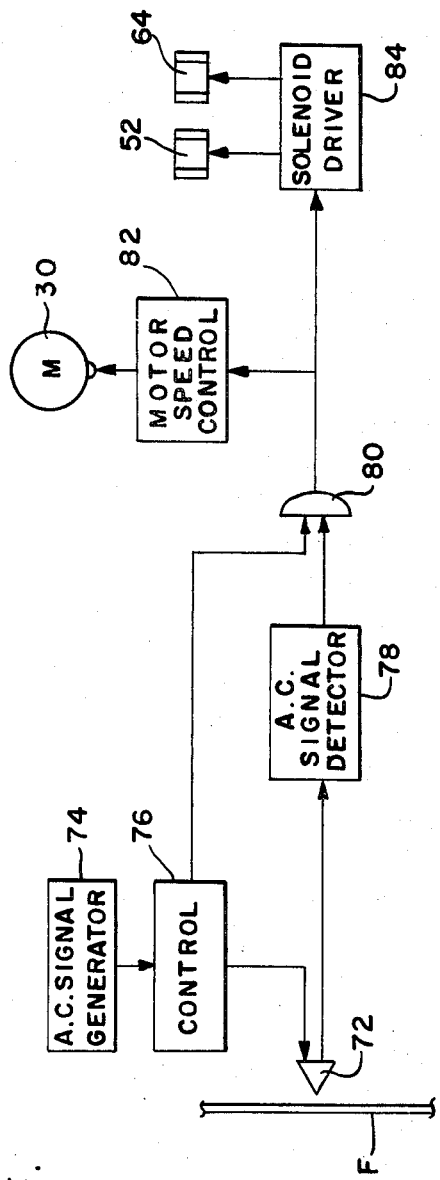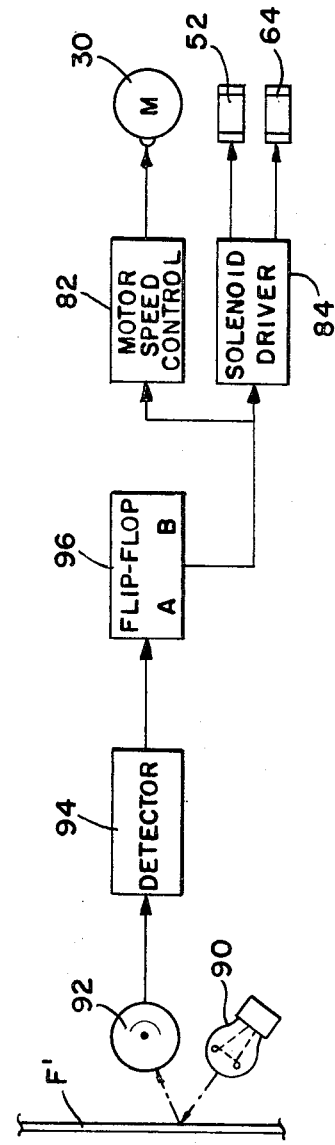
FIG. 5.
FIG. 6.
INVENTOR
EDWIN H. LAND
BY Brown & Mikulka and Robert L. Berger
ATTORNEYS

METHOD AND APPARATUS FOR EDITING MOTION PICTURE FILM

BACKGROUND OF THE INVENTION

This invention relates to motion picture film editing and more particularly, it concerns a novel method and apparatus by which such film may be edited and projected without deleterious physical alteration of the film while at the same time maintaining reasonable continuity in the projected image to be viewed.

Traditional techniques for editing motion picture film have involved a review of an exposed and developed film strip with a subsequent cutting out of unwanted film portions and splicing those portions of the film to be retained so that the sequence of image projection is made interesting to the viewer. This approach to film editing has proved generally satisfactory at least in a physical or mechanical sense. In an aesthetic sense however, problems are presented particularly to amateur and semi-professional motion picture enthusiasts because of the necessity of a choice between discarding portions of a single film strip to render the edited strip more interesting for viewing purposes and retaining all portions of the original film as a chronological record of events made during exposure of the same film with a camera.

SUMMARY OF THE PRESENT INVENTION

In accordance with the present invention, there is provided an unique method and apparatus for editing motion picture films by which the limitations associated with prior art techniques for accomplishing a similar result are substantially and effectively overcome. Essentially, the method of this invention entails the recording of signals on a track with a signal storage capacity corresponding in size to the length of the film to be edited, the signals delineating undesired portions of the film to be deleted from those portions thereof to be viewed by projection, and employing such signals to effect an increase in film advance speed during passage of the edited film portions through the optical axis of the projector simultaneously with blockage of the projection light during such passage. The manner in which the signals are recorded and detected may vary. For example, the film may be provided with a linear strip portion capable of receiving an electromagnetic signal and the projection apparatus provided with a magnetic transducing head for sensing the signals and transmitting an amplified control signal to film advance and projection light blocking means. Alternatively, the signals may take the form of removable opaque marks made on the film manually with an appropriate crayon or the like, the projection equipment in this instance having photoelectric means for sensing the marks and transmitting the signal to appropriate film feed and light control means. Other specific forms of signals may be used with appropriate sensing means and in each instance, the blockage of projection light during periods of increased film advance may be effected automatically together with other means enabling the variation of film advance speed. While the method and apparatus of this invention is particularly suited for use with projection equipment designed for handling cassettes, it is equally applicable to traditional projection equipment of the type in which film is advanced between supply and take-up reels.

Among the objects of the present invention are: the provision of an improved method and apparatus for editing motion picture film; the provision of such a method by which the necessity for cutting and resplicing or otherwise altering the physical characteristics of the film is eliminated; the provision of such a motion picture editing method and apparatus which is particularly suitable for use with projection equipment in which film cassettes are used; and the provision of a motion picture editing method and apparatus which minimizes the manipulative steps required by a person in actually editing the film.

Other objects and further scope of applicability of the present invention will become apparent from the detailed description to follow taken in conjunction with the accompanying drawings.

BRIEF DESCRIPTION OF THE DRAWINGS

FIG. 1 is a fragmentary side elevation in partial cross-section depicting a motion picture film cassette in relation to the major components of a projection apparatus incorporating means for the practice of the present invention;

FIG. 2 is an enlarged fragmentary cross-section taken on line 2—2 of FIG. 1;

FIG. 3 is an enlarged fragmentary view of a film strip adapted for use with the present invention;

FIG. 4 is an enlarged fragmentary view of an alternate form of film strip for use with the present invention;

FIG. 5 is a block diagram of a control circuit for the practice of the present invention with the film strip illustrated in FIG. 3 of the drawing; and FIG. 6 is a block diagram of a similar circuit adapted for use with the film strip illustrated in FIG. 4.

DETAILED DESCRIPTION OF THE PREFERRED EMBODIMENTS

Although the present invention is adaptable to diverse general types of projection apparatus, reference is made to the accompanying drawings for exemplary illustrations of embodiments of apparatus suited for the practice of the invention. As shown in FIG. 1 of the drawings, a cassette generally designated by the reference numeral 10 is operably positioned in a projector 12 having a projection lens 14. The cassette 10 includes supply and take-up spools 16 and 18 respectively, on which film F is carried for movement about a roller 20, past a film gate 24, aligned with the optical axis of the projector as defined by the axis of the lens 14, and around a snubbing roller 22. Light for projection is supplied by a lamp 26 positioned laterally of a triangular reflecting prism 28 to effect projection of the film image through the lens 14 to a screen or other image receiving means (not shown).

Although many of the components of the projector 12 have been omitted from the drawing in the interest of clarity, it will be noted that drive means for advancing the film F between the respective supply and take-up spools 16 and 18 in the disclosed embodiment includes a variable speed electric motor 30 having a multi-belt drive pulley 32 operably connected by belts 34 and 36 to splined drive shafts 38 and 40 engaged respectively with the spools 16 and 18. Although not shown in the drawings, it will be appreciated by those skilled in the art that the coupling of the drive including the belt 36 to the take-up spool 18 may include conventional slip clutch and brake means. For example, the belt 34 as depicted in FIG. 1 would not, in practice, positively drive the spool 16 during advancement of the film to the take-up spool 18 inasmuch as the two spools must be driven at the same tangential speed requiring a variance in angular velocity as a result of the changing diameter of the film wound thereon. The belt, therefore, will be effective only during rewinding of the film, the shafts 38 and 40 being equipped with appropriate clutch means (not shown) to this end.

A third belt 42 connects the motor 30 with an eccentric crank 44 forming part of an intermittent film drive means carried by the projector 12 and including a reciprocable claw 46 connected by a pin 48 to the eccentric 44. In accordance with conventional practice, the claw 46 operates to advance that portion of the film F extending between the roller 20 and the snubbing roller 22 incrementally, frame by frame, past the gate 24. Though ordinarily the claw 46 is maintained in a single operable relationship with respect to the projector mounted cartridge, in the embodiment shown, the claw 46 is retractable against the bias of a tension spring 50 by a solenoid 52 which functions, when energized, to advance a link 54 slidably in a tubular guide 56 between the positions depicted by solid and phantom lines in FIG. 1. Thus, in the solid line position maintained by the spring 50, the claw 46 is operative to advance the film F intermittently in the conventional manner. When the solenoid 52 is energized however, in a manner to be described in more detail below, the claw 46 is retracted to the position illustrated in phantom lines so as to be out of engagement with the film F.

In accordance with the present invention, the projection equipment is provided with a movable blind 58 for blocking the passage of light through the gate 24 and the lens 14 during editing of film strip portions. In the embodiment illustrated in FIGS. 1 and 2 of the drawings, the blind 58 is carried slidably for reciprocation in guides 60 fixed to the projector 12 and maintained normally in a retracted position clear of the optical axis by a compression spring 62. A solenoid 64 is provided to advance the blind 58 against the bias of the spring 62 over the optical axis of the projector 12 as defined by the lens 14.

In a manner which will become more apparent from the description below, the motor 30 and solenoids 52 and 64 are controlled in response to signals recorded on a track capable of relative movement with respect to a sensing or signal detection device. In the illustrated embodiments of this invention and as shown most clearly in FIG. 3 of the drawings, the film F is provided with a relatively narrow edge track 66 of magnetic material coated, laminated or otherwise affixed to the film in a manner similar to that used in the manufacture of magnetic sound or information storage tapes. The track 66, in the embodiment shown, is superimposed on the series of perforations 68 conventionally provided on motion picture film for engagement by the intermittent feed claw 46 along one side of the image carrying series of image frames 70.

A manner in which the film illustrated in FIG. 3 may be used in accordance with the present invention will be understood by reference to FIGS. 1 and 5 of the drawings. As shown in these figures, a magnetic transducing head 72 is mounted in the projector 12 in a position to be adjacent to film strip portion passing through the gate 24 to overlie the track 66. The head 72 is preferably of the "read-write" type; that is, it is operative both to impose a signal on the track 66 and to develop an electromagnetic response to a signal carried by the track. Thus it is contemplated that the projector 12 will be provided with an AC signal generator 74 operable by an appropriate control 76 to reorient the magnetic characteristics of the track 66 over any portion thereof along the length of the film F. The signal thus imposed on the track 66 may also be transduced by the head 72 and fed through an AC signal detector 78, a gate 80, to a motor speed control unit 82 and a solenoid driver 84. As depicted in FIG. 5, the motor 30 is under the direct control of the speed control unit 82 and also both solenoids 52 and 64 are energized simultaneously by the driver 84. The control 76 is coupled to the gate 80 to prevent the passage of a signal to the motor speed control and solenoid driver during use of the AC signal generator to place a signal on the track 66.

In the practice of the present invention employing a projector equipped with the circuit components illustrated in FIG. 5, the components shown in FIGS. 1 and 2 and the film strip illustrated in FIG. 3, the film strip to be edited is first passed through the projector to ascertain and locate undesired image frame portions thereof which should be deleted during presentation by projection of the remaining portions of the film strip in cartridge 10. Assuming that it is desired to so delete those image frames within the bracket 86 (FIG. 3), the control 76 is operated during projection of the film F for editing purposes so as to record an AC signal on the magnetic track 66 over that portion thereof adjacent the frames to be deleted.

After the film F has been edited by the recording of an AC signal over corresponding portions of the track 66, the film is ready for presentation to a viewer. During such presentation, those portions of the film F to be presented will be fed at normal projection rates of feed by the drive motor 30 through its connection to the eccentric 44 of the intermittent drive claw 46 and to the take-up spool 18. When, however, a signal is read or sensed by the transducing head 72, thus indicating a portion of the film to be deleted, the signal is passed to the motor speed control 82 in a manner aforementioned to increase the speed of the motor 30 and effect a high rate of film feed through the gate 24. Simultaneously with such an increase in motor speed and thus rate of film advance or feed, the solenoids 52 and 64 are actuated to retract the intermittent advance claw 46 and block passage of projection light through the lens 14, respectively. Similarly, at the end of the deleted portion, the absence of a signal on the track 66 will terminate operation of the signal detector 78, the motor speed control 82 and the solenoid driver 84, thereby effecting a return of the motor speed to that normally used for projection as well as a return of the claw 46 to its operative position by the tension spring 50 and a return of the blind 58 to its retracted position by the compression spring 62. In this manner, the presentation during projection of the film F to a viewer will include only those portions of the film that the editor desires to so present. Although the presentation will be interrupted slightly during passage of the edited portions through the gate 24, the current state of the art with respect to electric motors and controls therefor, as well as the low inertia of the limited amount of film contained in the cartridge 10, permits that interval to be reduced to such a short duration of time as to be undetectable by the human eye.

An alternative to the projection system described above and by which the method of this invention may be practiced will be understood by reference to FIGS. 4 and 6 of the drawings. As shown in FIG. 4, a conventional film strip of the F' is shown to include the series of image frames 70 adjacent to an edge portion thereof in which the perforations 68 are provided. In this instance, the portion of the film strip F' to be deleted is designated by a pair of spaced optical marks 86 and 88 respectively. Although the marks may be placed on the film F' in any of several ways, it is contemplates that they may be opaque and inscribed to contrast the translucent or transparent nature of the film on the edge portion of the film simply by the use of a crayon or the like. In this way, they may be removed should it be desired to re-edit the film.

To use the film F', the same organization of the projector 12 is employed with the exception that transducing head 72 is replaced by a lamp 90 and a photocell 92. As shown in FIG. 6 of the drawings, the photocell is connected to a detector 94, which in turn feeds a flip-flop 96 conditioned by the detector between A and B states. The motor speed control 82 and solenoid driver 84 are again provided in this embodiment but are operated under the control of the flip-flop 96. In operation, the flip-flop is initially conditioned in the A state, thereby effecting operation of the motor at normal projection speeds and deenergization of the solenoids 52 and 64. Upon passage of the opaque mark 86 in the path of light between the lamp 90 and photocell 92, the flip-flop will be changed to the B state, thus bringing about operation of the motor speed control to advance the speed of the motor 30 as well as operation of the solenoid driver to energize the solenoids 52 and 64. Upon passage of the second opaque mark 88 between the lamp 90 and photocell 92, the flip-flop is returned to the A state to restore the motor and solenoids to their initial condition.

To edit the film F' in this manner, it will be appreciated that the editor, upon reviewing the film, will stop the advance thereof at the appropriate places and manually place the marks 86 and 88 on the film as signals designating those portions of the film to be removed from those to be viewed by projection. In all other respects, the editing method performed using the arrangement the embodiment of FIGS. 4 and 6 remains the same as that of the preceding embodiment.

Thus it will be appreciated that by this invention there is provided a highly improved method for editing motion picture films by which the above mentioned objectives are completely fulfilled. It is contemplated also that numerous diverse types of projection equipment may be employed in the practice of the present invention. For example, the speed increase during passage of the film portions to be deleted through the film gate may be effected mechanically through appropriate transmission means brought into operation by either of the control signal detecting embodiments illustrated and described herein. Also it is contemplated that other forms of film signal means could be employed, such as for example, by using notches or other means in the film capable of being sensed mechanically. Because of the numerous specific forms or adaptations of the present invention, it is expressly intended that the foregoing description is illustrative only, not limiting, and that the true spirit and scope of the present invention be determined by reference to the appended claims.

I claim:

1. The method of projecting selected portions of a single motion picture film formed of a conventional series of image-bearing frames equally spaced lengthwise therealong and therefore capable of being projected at a normal projection speed in projection apparatus to provide a conventional continuous uninterrupted motion picture presentation of the entire sequence of said frames, the undesired portions of said single motion picture film being interspersed between said selected portions thereof, comprising the steps of: recording signals on a track with a signal storage capacity corresponding in size to the length of said single motion picture film; said signals delineating said undesired portions of said film from said selected portions thereof; advancing said film through a projection axis; effecting relative movement of said track and a signal sensing device in synchronism with said film advance; and regulating the rate of film advance in response to said signals between normal projection feed rates during passage of said selected portions through said projection axis and relatively high feed rates during passage of said undesired portions through said axis so that said selected portions of said single motion picture film are projected in a substantially conventional continuous uninterrupted motion picture presentation, said undesired portions being capable of projection in subsequent projection operations employing said single motion picture film.

2. The method recited in claim 1 including the step of blocking the passage of light on said axis during advancement of said film at said relatively high rates of feed.

3. The method recited in claim 1 wherein said track is located on and coextensive with said film.

4. The method of projecting selected portions of a single motion picture film formed of a conventional series of image-bearing frames equally spaced lengthwise therealong and therefore capable of being projected at a normal projection speed hn projection apparatus to provide a conventional continuous uninterrupted motion picture presentation of the entire sequence of said frames, the undesired portions of said single motion picture film being interspersed between said selected portions thereof, comprising the steps of: recording signals on said film to delineate said undesired portions from said selected portions thereof; advancing said film through a projection axis at one rate of feed during passage of said selected portions through said axis, and advancing said film at a second relatively high rate of speed in response to said signals during passage of said undesired portions through said axis so that said selected portions of said single motion picture film are projected in a substantially conventional continuous uninterrupted motion picture presentation, said undesired portions being capable of projection in subsequent projection operations employing said single motion picture film.

5. The method recited in claim 4 including the step of blocking the passage of light on said axis during advancement of said film at said second rate of feed.

6. The method recited in claim 4 wherein said film is advanced intermittently at said one rate of feed and continuously at said second rate of feed.

7. The method recited in claim 4 wherein said signals are electromagnetically recorded on said film.

8. The method recited in claim 4 wherein said signals are recorded optically on said film.

9. The method of projecting selected portions of a single motion picture film formed of a conventional series of image-bearing frames equally spaced lengthwise therealong and therefore capable of being projected at a normal projection speed in projection apparatus to provide a conventional continuous uninterrupted motion picture presentation of the entire sequence of said frames, the undesired portions of said single motion picture film being interspersed between said selected portions thereof, comprising the steps of: recording signals on said film to delineate said undesired portions of said film from said selected portions thereof; advancing said film through a path of light at speed to reproduce by projection said selected portions thereof; blocking said path of light in response to said signals to prevent reproduction of said undesired portions of said film; and increasing the speed of the film advance during the period in which said path of light is blocked in response to said signals so that said selected portions of said single motion picture film are projected in a substantially conventional continuous uninterrupted motion picture presentation, said undesired portions being capable of projection in subsequent projection operations employing said single motion picture film.

10. The method recited in claim 9 including the step of providing said film with a magnetic recording track to receive said signals.

11. The method recited in claim 9 wherein said signals are opaque marks inscribed on said film between said selected portions and said undesired portions.

12. Apparatus for projecting selected portions of a single motion picture film, formed of a conventional series of image-bearing frames equally spaced lengthwise therealong and therefore capable of being projected at a normal projection speed in projection apparatus to provide a conventional continuous uninterrupted motion picture presentation of the entire sequence of said frames, the undesired portions of said single motion picture film being interspersed between said selected portions thereof, said apparatus comprising: means to establish a path of light through which said film is passed for successive projection of a series of image frames thereon, means for forming signals delineating said undesired portions of said film from said selected portions thereof; means for detecting said signals; drive means for advancing said film through said light path; and means to control said drive means in response to said signal detecting means to advance said selected portions of said film through said path at normal projection rates of feed and to advance said undesired portions thereof through said path at a relatively high rate of feed so that said selected portions of said single motion picture film are projected in a substantially conventional continuous uninterrupted motion picture presentation, said undesired portions being capable of projection in subsequent projection operations employing said single motion picture film.

13. The apparatus recited in claim 12 including means to block said path of light during passage of said undesired portions therethrough.

14. The apparatus recited in claim 12 including reciprocating means connected to said drive means for advancing said film at said normal projection rates of feed.

15. The apparatus recited in claim 14 including means for retracting said reciprocating means during operation of said drive means at said high rate of feed.

16. The apparatus recited in claim 12 wherein said signal forming means includes means for magnetically forming said signals on said film and said signal detecting means includes a magnetic transducing head for sensing said signals.

17. The apparatus recited in claim 12 wherein said signal forming means includes means for optically forming said signals on said film and said signal detecting means includes photoelectric means for sensing said signals.

* * * * *